(12) United States Patent
Shu et al.

(10) Patent No.: US 9,582,303 B2
(45) Date of Patent: Feb. 28, 2017

(54) EXTENDING PLACEMENT CONSTRAINTS FOR VIRTUAL MACHINE PLACEMENT, LOAD BALANCING MIGRATIONS, AND FAILOVER WITHOUT CODING

(71) Applicant: VMware, Inc., Palo Alto, CA (US)

(72) Inventors: Guoqiang Shu, San Jose, CA (US); Keith Farkas, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 50 days.

(21) Appl. No.: 14/195,790

(22) Filed: Mar. 3, 2014

(65) Prior Publication Data

US 2015/0248305 A1 Sep. 3, 2015

(51) Int. Cl.
*G06F 9/455* (2006.01)
*G06F 9/50* (2006.01)

(52) U.S. Cl.
CPC ...... *G06F 9/45533* (2013.01); *G06F 9/45558* (2013.01); *G06F 9/50* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2007/0157185 A1* | 7/2007 | Semerdzhiev | .......... | G06F 9/455 717/148 |
| 2009/0328225 A1* | 12/2009 | Chambers | .......... | G06F 21/10 726/26 |
| 2012/0266168 A1* | 10/2012 | Spivak | .......... | G06F 9/5055 718/1 |
| 2012/0311576 A1* | 12/2012 | Shu et al. | .......... | 718/1 |
| 2013/0097296 A1* | 4/2013 | Gehrmann | .......... | G06F 9/4856 709/223 |
| 2014/0025822 A1* | 1/2014 | Guha | .......... | G06F 15/173 709/226 |
| 2014/0337836 A1* | 11/2014 | Ismael | .......... | 718/1 |

\* cited by examiner

*Primary Examiner* — Tuan Dao
(74) *Attorney, Agent, or Firm* — Patterson & Sheridan LLP

(57) ABSTRACT

Techniques are described for placing virtual machines (VM) on computer hosts. In one embodiment, a user may compose a constraint specification document which includes VM and host properties and how they are retrieved, as well as constraint predicates that define valid VM placements on hosts. Use of the constraint specification document permits new constraints, including constraints that involve new properties, to be handled without requiring changing the underlying code for collecting required input data and processing said data to determine whether placement constraints are satisfied. Instead, based on the constraint specification document, a resource scheduler or high availability module may program a programmable data collector to fetch the needed properties from the appropriate places. Then, the resource scheduler or high availability module may parse the constraint predicates, evaluate potential placements to determine whether the constraint predicates are satisfied, and place VMs according to placements that satisfy the constraint predicates.

20 Claims, 3 Drawing Sheets

EXTENDING PLACEMENT CONSTRAINTS FOR VIRTUAL MACHINE PLACEMENT, LOAD BALANCING MIGRATIONS, AND FAILOVER WITHOUT CODING

BACKGROUND

Virtualization management software allows multiple virtual machines (VMs) to execute on a single hardware computing platform. Such management software also manages how computing resources are allocated to each VM. In addition, the virtualization management software can be configured to move VMs between servers (also referred to herein as "host systems" or "host computers") in the cluster. An example of VM migration technology is VMware VMotion®, available from VMware, Inc. of Palo Alto, Calif. An example of the virtualization management software is VMware Distributed Resource Scheduler™, also available from VMware.

A resource management service handles the placement and scheduling of virtual machines (VMs) on a set of hosts, in accordance with a set of constraints and objectives. Doing an permits users to treat the set of hosts as one host, leaving the resource management service to handle the placement, migration, etc. of VMs onto particular hosts within the set of hosts. For example, to address constraint violations and achieve placement objectives, the cluster resource management service can generate and migrate VMs between hosts, as well as recommend to power on (or off) a host. For a VM to be powered-on a host within the host set, the set typically needs to have sufficient computing resources compatible with the VM's execution constraints to meet certain requirements, and those resources must be available in unfragmented form, i.e., all on a single host in the set.

Additionally, virtualized computing environments can implement a wide variety of redundancy techniques to establish a high availability system, or "HAS." Such techniques set aside resources, such as hardware, systems, components, subsystems or even software, so that in the event of a failure, relevant functionality may be maintained or quickly recovered. Redundancy may be provided at any of a variety of levels. For example, conventional techniques for managing redundant information storage or transmission can use error correcting codes, cyclic redundancy checks, and/or storage array technologies such as RAID ("Reliable Array of Inexpensive Disks"). Redundant subsystems such as power supplies or storage controllers can also be employed to improve system availability.

In these traditional resource management services and high availability systems, specialized software needs to be developed to handle new VM placement constraints and objectives. For example, if a developer were to add a flash based cache to a hypervisor, as well as the ability to configure flash cache reservations for individual VMs, then the resource management service and high availability system must be updated to consider flash cache reservation constraints. Otherwise, the powering-on, migration, and restarting of VMs can fail where the constraints are not satisfied (e.g., where a VM requires a quantity of flash cache that cannot be provided by the host on which the VM is migrated or restarted). Implementing such constraints typically requires considerable modifications to code, including code used to collect required input data (e.g., relating to flash cache reservations and host capacity) and to process such input to determine whether the constraints are satisfied (e.g., whether the flash cache constraints are satisfied).

SUMMARY

One embodiment disclosed herein provides a method of placing a virtual machine (VM) on a computer host or group of computer hosts. The method generally includes parsing a specification including properties and placement constraints, where each placement constraint specifies a condition for VM placement on the host or the group of hosts based on one or more of the properties. The method also includes autonomously collecting information associated with the properties of the specification to determine initial values for the properties, where the properties are collected by one or more programmable data collectors from the host or the group of hosts or from a centralized server which manages the host or the group of hosts. In addition, the method includes placing the VM on the host or the group of hosts if the placement constraints are satisfied for the placement.

Further embodiments of the present invention include a computer system configured to carry out the above method, and a non-transitory computer-readable storage medium comprising instructions that cause the computer system to carry out the above method.

DETAILED DESCRIPTION

Embodiments disclosed herein provide techniques for placing virtual machines on computer hosts. In one embodiment, a user may compose a constraint specification document which includes VM and host properties and how they are retrieved, as well as constraint predicates that define valid VM placements on hosts. Using the constraint specification document permits new constraints, including constraints that involve new properties, to be handled without requiring changes to the underlying code which collects and processes input data and processing said data to determine whether placement constraints are satisfied. Instead, based on the constraint specification document, a resource scheduler or high availability module may program a programmable data collector to fetch the needed properties from the appropriate sources. In addition, the resource scheduler or high availability module may parse the constraint predicates, evaluate potential placements to determine whether the constraint predicates are satisfied, and place VMs on hosts in a manner that satisfies the constraint predicates.

Figure 1:
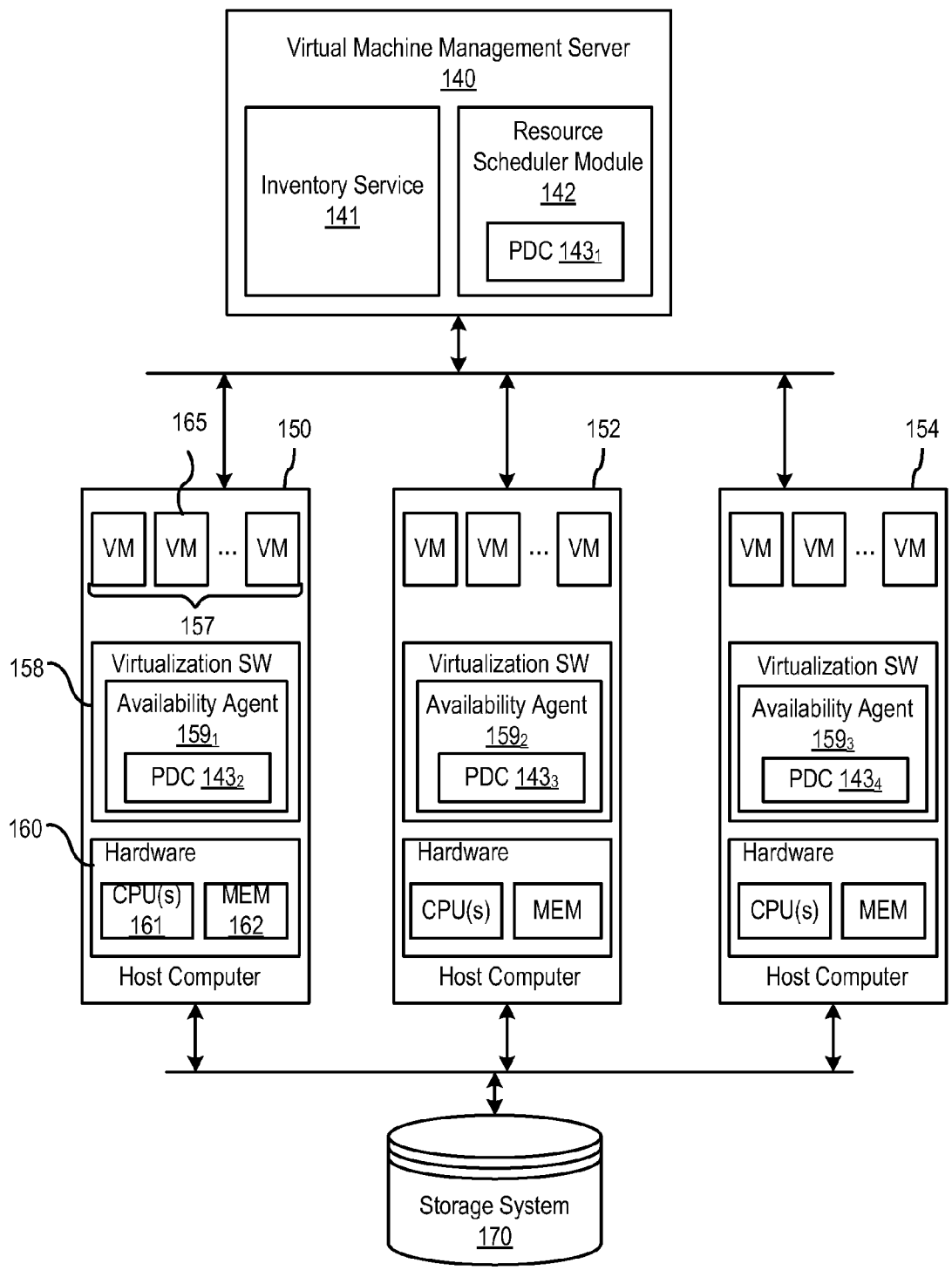
FIG. 1 depicts a simplified block diagram of a virtualized computer system in which one or more embodiments may be implemented.

FIG. 1 depicts a simplified block diagram of a virtualized computer system in which one or more embodiments may be implemented. As shown, desktops run in virtual machines 157 which are instantiated on a group of host computers commonly referred to as a cluster (depicted in FIG. 1 as host computers 150, 152, 154). Each of the host computers includes virtualization software 158 and hardware 160, including one or more CPUs 161 and system memory 162, and is coupled to a shared storage device 170.

Virtualization software 158 performs system resource management and virtual machine resource emulation. Virtual machine resource emulation may be performed by a virtual machine monitor (VMM) component (not shown). In some implementations, each virtual machine 157 may have a corresponding VMM instance. Depending on implementation, virtualization software 158 may be unhosted or hosted. Unhosted virtualization software generally relies on a specialized virtualization kernel for managing system resources, whereas hosted virtualization software relies on a commodity operating system—the "hosting operating system"—such as Windows, Mac OS X, or Linux to manage system resources. Illustratively, virtualization software 158 includes an availability agent 159 which, as discussed in greater detail below, monitors the health of the host computers 150, 152, 154 and determines, e.g., hosts on which VMs currently running on host 150 are to restart should one of the VMs fail.

A virtual machine management server 140 controls provisioning of VMs, powering of VMs on and off, and resource management of the VMs in the host computers, among other things. In a particular embodiment, VM management server 140 may be an implementation of vCenter, a product commercially available from VMware, Inc. Although shown as a separate computer system, it should be recognized that VM management server 140 may instead be implemented in other ways, such as a VM that runs in one of host computers 150, 152, 154.

As shown, virtual machine management software 158 includes an inventory service 141 and a resource scheduler module 142. Resource scheduler module 142 is responsible for handling initial placements of VMs on host computers 150, 152, 154 as well as for performing load balancing migrations of VMs between host computers 150, 152, 154. To determine the placements to make, resource scheduler module 142 may fetch data from inventory service 141. The inventory service maintains data about VMs 157 and hosts 150, 152, 154. Such data may include resources available to a VM on each host, VMs currently running on each host, the properties of those VMs, and properties of a given VM that is being placed. The resource scheduler module 142 may then execute a placement algorithm with a workflow dependent on the operation. For load balancing, the resource scheduler module 142 migrates VMs between hosts and changes resource entitlements to help ensure all VMs are getting the resources they deserve. For powering on VMs, the resource scheduler module 142 determines which host should be used, and may possibly move some already running VMs to other hosts to make capacity available on a given host. These workflows are based on the fetched data. In one embodiment, the placement algorithm may evaluate whether a constraint predicate specified in the constraint specification document is satisfied when it assesses whether a given VM can be placed moved to a given host. Constraint predicates can generally capture any constraint that is capable of being expressed in terms of the available data. The constraint predicates may, for example, apply to specific hosts, specific types of VMs, or be a general constraint that must be satisfied for any host or VM or other resource for which there is information. For example, each VM may have a certain amount of a resource reserved (e.g., 100 MHz of CPU time for a given VM), and the constraint predicate may specify that the total resource reservations on a host should not exceed the available resources on the host. As another example, the constraint predicate may specify that only one fault tolerant type VM may run on any host at any point in time.

As shown, the virtualization software running in the host computers 150, 152, 154 each include a high availability agent $159_{1-3}$. High availability agents $159_{1-3}$ handle failover events so that VMs are migrated seamlessly to other host computers when an initial host experiences a failure. In one embodiment, one of the high availability agents $159_{1-3}$ may be a master high availability agent that makes determines where to place VMs from a failed host. Each high availability agent $159_{1-3}$ may fetch VM and host properties directly from host management services running in the virtualization software of each of the hosts 150, 152, 154. The high availability agents $159_{1-3}$ may then transmit the collected properties may to the master high availability agent. In turn, the master high availability agent may make placement decisions using a similar placement algorithm as that discussed above with respect to the resource scheduler module 142 but which is executed by the master.

Figure 2:
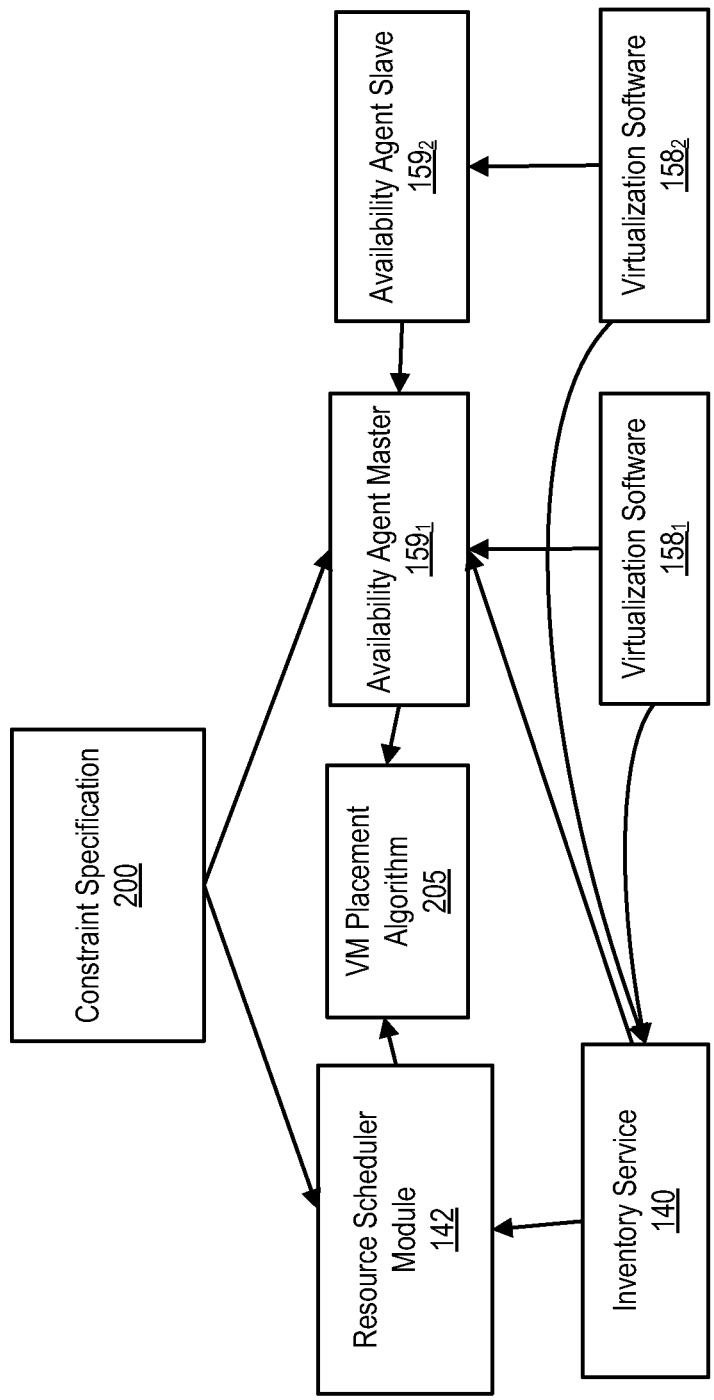
FIG. 2 illustrates an approach for collecting relevant information and determining virtual machine placement given a constraint specification, according to one embodiment.

FIG. 2 illustrates an approach for collecting relevant information and determining virtual machine placement given a constraint specification, according to one embodiment. As shown, a constraint specification file 200 is sent to an interface, via which the constraint specification file 200 is supplied to resource scheduler module 142 and high availability agent master $159_1$. For example, the constraint specification file 200 may be authored by a user or a software module. This constraint specification file includes the specification for one or more constraints. The specification for a given constraint includes (1) VM and host properties used in constraint and how the properties are retrieved or derived, (2) constraint predicate (also referred to herein as placement constraint) which defines what is a valid placement for VMs running on a host, and, optionally, (3) values of some properties that cannot be retrieved and are thus included in the constraint specification itself. Such a constraint specification file 200 may be transmitted via a central application programming interface (API) gateway to resource scheduler module 142 and high availability agent master $159_1$.

The resource scheduler module 142 and high availability agent master $159_1$ may include a programmable data collector (PDC) module $143_{1-4}$ configured to retrieve values of the properties listed in the constraint specification file. In one embodiment, programmable data collector modules in the resource scheduler module 142 and high availability agent master $159_1$ parse a data collection portion of the constraint specification file 200 to determine which properties need to be retrieved. The programmable data collector modules then fetch those properties from a specified resource (e.g., inventory service 141 or a virtualization software 158 module) and store the fetched properties in snapshot objects, which are objects that represent VM state and settings. This capability can be enabled by including in the specification for the constraint (which is included in the constrain specification file 200) names for the properties that are understood by the specified resource. Optionally, the constraint specification 200 may include data collection properties, such as the time range of interest for a given set of values, which the programmable data collector applies when fetching the data.

As further shown in FIG. 2, resource scheduler module 142 and high availability agent master $159_1$ both invoke a VM placement algorithm 205. The resource scheduler module 142 and high availability agent master $159_1$ dynamically parse a constraint predicate portion of the constraint specification of a given constraint, which is included in the constraint specification file 200. As discussed, each constraint predicate defines a placement condition for a host and VMs running on the host. The constraint predicate may be defined in terms of the properties listed in the specification for the constraint. A variety of resource allocation constraints may be employed including load balancing constraints, VM co-location constraints, capacity or performance constraints, constraints based on network connectivity or specialized hardware/device support provided by an underlying host system, among others. The VM placement algorithm 205 may evaluate the constraint predicates for one or more hosts, and place a VM on a selected host only if all the constraint predicates evaluate to true for the placement. For example, in the flash cache case, the constraint predicate may specify that the total flash memory available on a host must be greater than the flash memory reserved by all the VMs running on the host. In such a case, the VM placement algorithm 205 determines whether this condition is satisfied if a VM were to be placed on a particular host.

Figure 3:
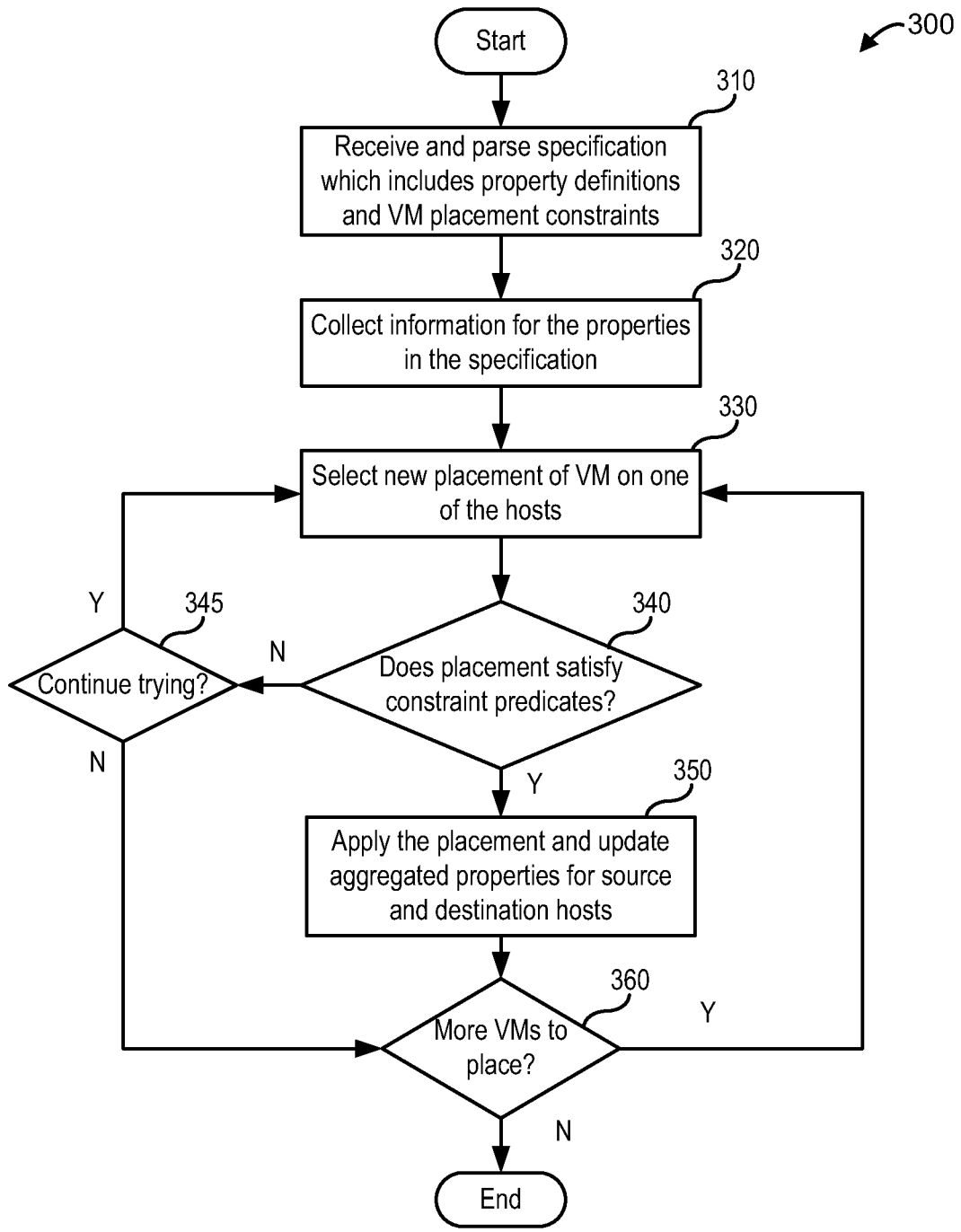
FIG. 3 illustrates a method for placing virtual machines to satisfy user-defined placement constraints, according to one embodiment.

FIG. 3 illustrates a method 300 for placing virtual machines to satisfy user-defined placement constraints, according to one embodiment. As shown, the method 300 begins at step 310, where a resource scheduler or an availability agent receives and parses a constraint specification file. The constraint specification file may include VM and host properties used in the specified constraints and how the constraints are retrieved or derived, constraint predicates which define what is a valid placement for a host and VMs running on the host, and, optionally, and values of some properties that are not retrieved. The constraint predicates may be evaluated for each host, with a host being considered a candidate for placement of a VM only if the constraint predicate evaluates to true.

In one embodiment, a constraint predicate may be defined using any of the following constructs: (1) integer and string literals, (2) primitive properties of a host object, (3) an aggregate property of any support entity such as host object, network object, or host group object, and (4) mathematical and logic operations. Here, a primitive property may be any basic property which the resource scheduler module 142 may, e.g., directly acquire, such as a "host.summary.runtime.powerState" property which indicates whether the host is powered on or off. By contrast, an aggregated property is the sum of a given function (referred to herein as the "contribution function") over a set of similar entities, such as the VMs running on a given host. Each aggregated property may be specified by a corresponding contribution function of the predicate components (1)-(4). For example, the aggregated property $p_1$="the total number of vCPUs deployed on this host" may be defined using a contribution function such as $f_1(vm, host)$=vm.config.hardware.numCPU, where the numCPU is the number of vCPUs used by a VM. Here, $f_1(vm, host)$ gives the number of vCPUs deployed on the host, which is a VM aggregation function with the set of VMs defined by the host in question. This aggregated property may be useful where, e.g., physical CPUs can only be overloaded by a given factor (e.g., 10). In such a case, $f_1(vm, host)$ may be compared with a total physical CPUs property to determine whether this condition is satisfied. As another example, the more complicated aggregated property $p_2$="the number of multi-core fault tolerance VMs on this host" may be defined using the contribution function $f_2(vm, host)$=IF vm.config.hardware.numCPU>1 && vm.runtime.faultToleranceState≠notConfigured THEN 1 ELSE 0. The aggregated property $p_2$ may then be used to define, e.g., a condition that the number of multi-core fault tolerance VMs per host does not exceed some maximum number, i.e., $p_2 \leq K$, where K is some constant.

Two examples of aggregated properties include a total aggregated property and a delta aggregated property. A total aggregated property may be determined by adding up the property over all VMs on the host, for example. On the other hand, a delta aggregated property may be computed by adding up the property over additional VMs placed on the host since an initialized state. This distinction is important, as a constraint may relate to either the "total capacity" or the "free capacity" of a given resource. VM usage may be compared with total capacity using a total aggregated property, while VM usage may be compared with free capacity using a delta aggregated property.

At step 320, the resource scheduler or availability agent collects information associated with the properties in the constraint specification. In one embodiment, a programmable data collector may be used to retrieve VM and host properties. For example, the programmable data collector may proactively fetch property values from inventory service 141 or another component. As another example, the programmable data collector may provision a property notification channel. For example, each of the availability agents $159_{1-3}$ may listen to changes from a corresponding management application of the virtualization software running on the host. The availability agents $159_{1-3}$ may then send interesting property changes to the master availability agent for use in determining VM placement. Techniques are known for an agent to subscribe to receive notification of changes to properties such that the virtualization software notifies the availability agents when the properties change, after which the availability agents may fetch the changed property values. In yet another example, a client of the placement service (E.g., the master node of availability agents $159_{1-3}$ or resource scheduler module 142) may push additional property values explicitly to the availability agents or resource schedule to be cached, using an application programming interface (API) exposed by the service.

In one embodiment, properties may be captured as key-value pairs, with the key being the name of the property and the value being the property value that is fetched or a uniform resource locator (URL) from which the value may be directly obtained. Such key-value pairs may then be stored in snapshot objects.

At step 330, the resource scheduler or availability agent selects a candidate placement of the VM on one of the hosts. Techniques are known for selecting a host to use for placing a VM. In the selection of hosts to place VMs on, some backtracking may be involved where placing one VM makes placement of a second VM impossible. In such a case, the resource scheduler or availability agent may determine an alternative placement for the first VM again so that a placement for the second VM may be found.

At step 340, the resource scheduler or availability agent determines whether a new candidate placement satisfies the constraint predicates. In one embodiment, the resource scheduler or availability agent may input stored snapshot objects into a placement algorithm. One challenge in evaluating constraint predicates is that a large number of hypothetical moves/placements may need to be considered to achieve a particular goal (e.g., load balancing), making the computation of aggregated properties difficult if the contribution function must be evaluated to obtain the contribution function for each move. To overcome this challenge, aggregated properties may be computed on an incremental basis in one embodiment. In such a case, the resource scheduler module 142 or master availability agent may first evaluate the aggregate property values for each host. For a total aggregated property, the resource scheduler module 142 or master availability agent then determines a sum of contribution values, for example, for each VM running on the host. The total aggregated property may be initialized as this sum. In contrast, delta aggregated properties may be initialized to zero. In both cases, when a constraint predicate is evaluated, the aggregated property referenced in the predicate may be recomputed by adding, to the current value on the host and, the sum of the contribution function values of VM(s) which are being proposed for placement on that host.

If the evaluated placement does not satisfy the constraint predicate at step 340, the method 300 proceeds to step 345, where the resource scheduler or availability agent decides whether to continue trying. For example, the resource scheduler or availability agent may try for a given number of times and give up if no good placement is found. If the resource scheduler or availability agent decides to continue trying, then the method returns to step 330, where the resource scheduler or availability agent selects another placement of the VM to analyze. As discussed, techniques are known for picking a next host to evaluate as a candidate for placing the VM. Some backtracking may also be involved where placing one VM makes placement of a second VM impossible. In such a case, the resource scheduler or availability agent may attempts to re-place the first VM so that a placement for the second VM may be found. On the other hand, if the resource scheduler or availability agent decides not to continue, then the method 300 proceeds to step 360, where the resource scheduler or availability agent determines whether there are more VMs to place.

If the evaluated placement satisfies the constraint predicate at step 340, then at step 350 the resource scheduler or availability agent applies the placement and updates the aggregated properties for the source and destination hosts. Applying the placement may include provisioning a VM on the selected host or migrating the VM from the source host to the destination host. Techniques are known for such provisioning and migrating. Note, placement decisions may not be executed immediately, as the decisions may instead by recorded and executed after all decisions are made. In addition to applying the placement, the aggregated properties on one or more hosts may be updated to reflect that VM placement. For example, where a VM is provisioned on a host, the aggregated properties of that host may be updated to include the resource reservations for the VM. Where the VM is migrated from another host, the aggregated properties of that other host may also be updated to add back resources which were previously reserved for the VM but are no longer reserved.

At step 360, the resource scheduler or master availability agent determines whether additional VMs need to be placed. If so, then the method 300 returns to step 330, where the resource scheduler or master availability agent determines selects another new placement of a VM on a host.

Although discussed above primarily with respect to placement constraints defined and evaluated for hosts, a placement constraint may also be defined for an entity other than a host. For example, a placement constraint may specify that a cluster of hosts should never be loaded more than 80% of capacity, or no more than a given number of VMs should be associated with a virtual network available in the cluster. Placement constraints may also relate to groups of hosts. For example, a placement constraint may specify that no two VMs belonging to an externally-defined group can be placed on hosts that are in a previously-defined host group. This constraint may be applied, e.g., to keep VMs that serve a similar function running on hardware that does not share a common point of failure.

Although discussed above with respect to hard constraints which must be met for placement, some embodiments may also allow for soft constraints that are optionally enforced. For example, the constraint specification file may include a ranking of the constraints, and the placement algorithm may then attempt to satisfy as many as the constraints as possible, evaluating them in priority order when a trade-off has to be made. In another embodiment, weights may be associated with each constraint, and the placement algorithm may attempt to maximize the overall score.

Advantageously, embodiments disclosed herein permit new VM placement constraints to be taken into account in initial placement of VMs on hosts, as well as load balancing and failover, without requiring considerable modifications to code for components that collect required input data and process the data to determine whether the constraints are satisfied. Rather than modifying the code, a developer or end user simply adds a new entry to a constraint specification document, which is then interpreted at runtime time to collect the appropriate input data and implement placement constraints specified in the document.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of placing a virtual machine (VM) on a computer host or group of computer hosts, comprising:
    parsing a specification file, the specification file specifying properties whose values are to be determined and placement constraints, each placement constraint defining a condition for VM placement on the host or the group of hosts as a function of one or more of the properties;
    determining values for the properties based on information autonomously collected by one or more programmable data collectors from the host or the group of hosts or from a centralized server which manages the host or the group of hosts, the data collectors operating in accordance with data collection properties specified in the specification file;
    determining if the placement constraints in the specification file are satisfied using the determined values of the properties; and
    placing the VM on the host or the group of hosts if the placement constraints in the specification file are satisfied for the placement.

2. The method of claim 1, wherein each property is one of a basic property of the host or VMs running thereon, the group of hosts or VMs running thereon, or a network, or an aggregated property that is a sum of basic properties.

3. The method of claim 2, wherein the placement constraints each require a quantity of an aggregated property to be less than a corresponding quantity of a resource on the host, on a network, or across the group of hosts.

4. The method of claim 2, wherein one of the placement constraints requires a quantity of VMs on a virtual network to be less than a predefined threshold.

5. The method of claim 2, wherein the aggregated property is one of a total aggregated property computed by summing over all VMs on the host, a network, or the group of hosts or a delta aggregated property computed by summing over only additional VMs placed on the host, the network, or the group of hosts since the values for the properties were determined.

6. The method of claim 1, further comprising, updating the values for the properties after placing the VM.

7. The method of claim 1, wherein the placement is performed in response to a determination to migrate the VM or launch the VM as a new VM.

8. The method of claim 1, wherein the parsing, the collecting, the determining if the placement constraints in the specification file are satisfied, and the placing is performed by one of a resource management service, which handles placement and scheduling of the VMs, or a high availability service, which handles failover of VMs.

9. A non-transitory computer-readable storage medium comprising instructions for causing a computer system to carry out a method of placing a virtual machine (VM) on a computer host or group of computer hosts, said method comprising the steps of:
    parsing a specification file, the specification file specifying properties whose values are to be determined and placement constraints, each placement constraint defining a condition for VM placement on the host or the group of hosts as a function of one or more of the properties;
    determining values for the properties based on information autonomously collected by one or more programmable data collectors from the host or the group of hosts or from a centralized server which manages the host or the group of hosts, the data collectors operating in accordance with data collection properties specified in the specification file;
    determining if the placement constraints in the specification file are satisfied using the determined values of the properties; and
    placing the VM on the host or the group of hosts if the placement constraints in the specification file are satisfied for the placement.

10. The computer-readable storage medium of claim 9, wherein each property is one of a basic property of the host or VMs running thereon, the group of hosts or VMs running thereon, or a network, or an aggregated property that is a sum of basic properties.

11. The computer-readable storage medium of claim 10, wherein the placement constraints each require a quantity of an aggregated property to be less than a corresponding quantity of a resource on the host, on a network, or across the group of hosts.

12. The computer-readable storage medium of claim 10, wherein one of the placement constraints requires a quantity of VMs on a virtual network to be less than a predefined threshold.

13. The computer-readable storage medium of claim 10, wherein the aggregated property is one of a total aggregated property computed by summing over all VMs on the host, a network, or the group of hosts or a delta aggregated property computed by summing over only additional VMs placed on the host, the network, or the group of hosts since the values for the properties were determined.

14. The computer-readable storage medium of claim 9, the operations further comprising, updating the values for the properties after placing the VM.

15. The computer-readable storage medium of claim 9, wherein the placement is performed in response to a determination to migrate the VM or launch the VM as a new VM.

16. The computer-readable storage medium of claim 9, wherein the parsing, the collecting, the determining if the placement constraints in the specification file are satisfied, and the placing is performed by one of a resource management service, which handles placement and scheduling of the VMs, or a high availability service, which handles failover of VMs.

17. A system, comprising:
   a memory; and
   a processor storing one or more applications, which, when executed on the processor, perform operations for placing a virtual machine (VM) on a computer host or group of computer hosts, the operations comprising:
   parsing a specification file, the specification file specifying properties whose values are to be determined and placement constraints, each placement constraint defining a condition for VM placement on the host or the group of hosts as a function of one or more of the properties;
   determining values for the properties based on information autonomously collected by one or more programmable data collectors from the host or the group of hosts or from a centralized server which manages the host or the group of hosts, the data collectors operating in accordance with data collection properties specified in the specification file;
   determining if the placement constraints in the specification file are satisfied using the determined values of the properties; and
   placing the VM on the host or the group of hosts if the placement constraints in the specification file are satisfied for the placement.

18. The system of claim 17, wherein each property is one of a basic property of the host or VMs running thereon, the group of hosts or VMs running thereon, or a network, or an aggregated property that is a sum of basic properties.

19. The system of claim 18, wherein the placement constraints each require quantity of an aggregated property to be less than a corresponding quantity of a resource on the host, on a network, or across the group of hosts.

20. The system of claim 17, wherein the parsing, the collecting, the determining if the placement constraints in the specification are satisfied, and the placing is performed by one of a resource management service, which handles placement and scheduling of the VMs, or a high availability service, which handles failover of VMs.

* * * * *